United States Patent
Klima et al.

(10) Patent No.: US 10,823,009 B2
(45) Date of Patent: Nov. 3, 2020

(54) METHOD FOR WORKING A HOUSING OF A TURBOCHARGER

(71) Applicant: MAN Energy Solutions SE, Augsburg (DE)

(72) Inventors: Jirí Klima, Namest nad Oslavou (CZ); Lukás Bozek, Pribyslavice (CZ)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 16/676,115

(22) Filed: Nov. 6, 2019

(65) Prior Publication Data

US 2020/0141278 A1    May 7, 2020

(30) Foreign Application Priority Data

Nov. 7, 2018    (DE) .................. 10 2018 127 708

(51) Int. Cl.
  *F01D 25/24* (2006.01)
  *F02C 6/12* (2006.01)
  *F01D 25/16* (2006.01)

(52) U.S. Cl.
  CPC ............. *F01D 25/24* (2013.01); *F01D 25/16* (2013.01); *F02C 6/12* (2013.01); *F05D 2220/40* (2013.01)

(58) Field of Classification Search
  CPC ........ F01D 25/12; F01D 25/125; F01D 25/16; F01D 25/24; F01D 25/26; F01D 9/026; F02C 6/12; F05D 2220/40; F05D 2230/20; Y02T 10/144; B60Y 2400/435
  See application file for complete search history.

(56) References Cited

U.S. PATENT DOCUMENTS

| | | | | |
|---|---|---|---|---|
| 6,328,827 | B1 * | 12/2001 | Bouzidi | C22F 1/10 148/556 |
| 8,109,712 | B2 * | 2/2012 | Ahmad | F01D 5/187 415/115 |
| 9,482,239 | B2 * | 11/2016 | Lischer | F04D 29/441 |
| 10,184,485 | B2 * | 1/2019 | Horsley | F04D 29/624 |
| 10,370,972 | B2 * | 8/2019 | Rhodes | F02B 33/40 |
| 2005/0005910 | A1 * | 1/2005 | Usui | F02M 55/004 123/456 |
| 2011/0286837 | A1 * | 11/2011 | Smatloch | F02C 6/12 415/170.1 |

* cited by examiner

*Primary Examiner* — Jesse S Bogue
(74) *Attorney, Agent, or Firm* — Cozen O'Connor

(57) ABSTRACT

A method for working a housing of a turbocharger, namely a bearing housing or a compressor housing or a turbine housing of the turbocharger has the following steps: providing the housing to be worked, filling at least one hollow space of the housing to be worked with an incompressible fluid; and building-up a fluid pressure in the respective hollow space filled with the incompressible fluid, at least locally deforming plastically a housing portion of the housing limiting the respective hollow space of the housing at least in portions.

9 Claims, 3 Drawing Sheets

METHOD FOR WORKING A HOUSING OF A TURBOCHARGER

BACKGROUND OF THE INVENTION

1. Field of the Invention

The invention relates to a method for working a housing of a turbocharger.

2. Description of the Related Art

A turbocharger comprises a compressor and a turbine. In the turbine of the turbocharger, a first process gas is expanded and energy extracted in the process. The energy extracted in the turbine is utilized in the compressor to compress a second process gas. The turbine and the compressor of the turbocharger comprise rotor-side assemblies and stator-side assemblies. The rotor-side assemblies of the turbine and of the compressor include a turbine wheel and a compressor wheel which are coupled via a shaft. The stator-side assemblies of the turbine and compressor include a turbine housing and a compressor housing. The shaft, which couples the turbine wheel to the compressor wheel, is mounted in a further stator-side assembly of the turbocharger, namely in a bearing housing, which is typically arranged between the turbine housing and the compressor housing.

The housings of a turbocharger, i.e., the turbine housing, the compressor housing and the bearing housing, are metallic housings. During operation, these are subjected to cyclical loads. The cyclical loads reduce the lifespan of the respective housing. There is a need for a housing of a turbocharger with longer lifespan, in order to thereby extend the lifespan of the turbocharger.

SUMMARY OF THE INVENTION

It is an object of the present invention to create a new method for working a housing of a turbocharger with longer service life.

This object may be solved through a method having at least the following steps: providing the housing to be worked, which is produced from a metallic material. Filling at least one hollow space of the housing to be worked with an incompressible fluid.

Increasing the pressure of the medium so that a local deformation of the walls, which surround the hollow space of the housing, occurs.

In accordance with an aspect of the present invention, it is proposed to work a metallic housing of a turbocharger, namely in that a hollow space of the housing is filled with an incompressible fluid and a fluid pressure is built up with which a housing portion of the housing, which at least in portions limits the hollow space filled with the incompressible fluid, is at least locally deformed plastically. In this way, internal stresses are introduced into the respective housing portion at least locally, which counteract a cyclical loading during the operation, as a result of which the lifespan of the respective housing can then be increased and the service life of the turbocharger extended.

Preferably, the fluid pressure for plastically deforming the housing portion which limits the respective hollow space of the housing at least in portions is determined dependent on the geometry and/or the wall thickness and/or the composition of the material of the housing portion to be plastically deformed. The fluid pressure, which is utilized for plastically deforming the housing portion, is dependent on the geometry of the housing portion to be plastically deformed, on the wall thickness of the same and dependent on the metallic material type of which the housing consists. Dependent on these quantities, it is then possible by simulation to determine the fluid pressure in order to create the mentioned plastic deformation.

According to an advantageous further development, the respective housing portion of the housing to be plastically deformed is plastically deformed such that after the removal of the fluid pressure, a residual internal pressure (negative) stress is created that reduces the positive tensile stress during the operation. By way of the mutual sum of the residual stress (−) and operating stress (+), the absolute value of the resulting operating stress is then reduced. In this way, the lifespan of the respective housing can be particularly advantageously extended.

According to an advantageous further development, a hollow space of the housing is filled with an incompressible fluid that during the operation of the turbocharger serves for the process gas conduction or the coolant conduction. In this manner, a particularly simple plastic deforming of a corresponding housing portion is possible.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein

BRIEF DESCRIPTION OF THE DRAWINGS

Preferred further developments of the invention are obtained from the following description. Exemplary embodiments of the invention are explained in more detail by way of the drawings without being restricted to this.

There it shows.

DETAILED DESCRIPTION OF THE PRESENTLY PREFERRED EMBODIMENTS

The invention relates to a method for processing a housing of a turbocharger. The housing of the turbocharger to be worked can be a turbine housing or a compressor housing or a bearing housing of the turbocharger.

Figure 1:
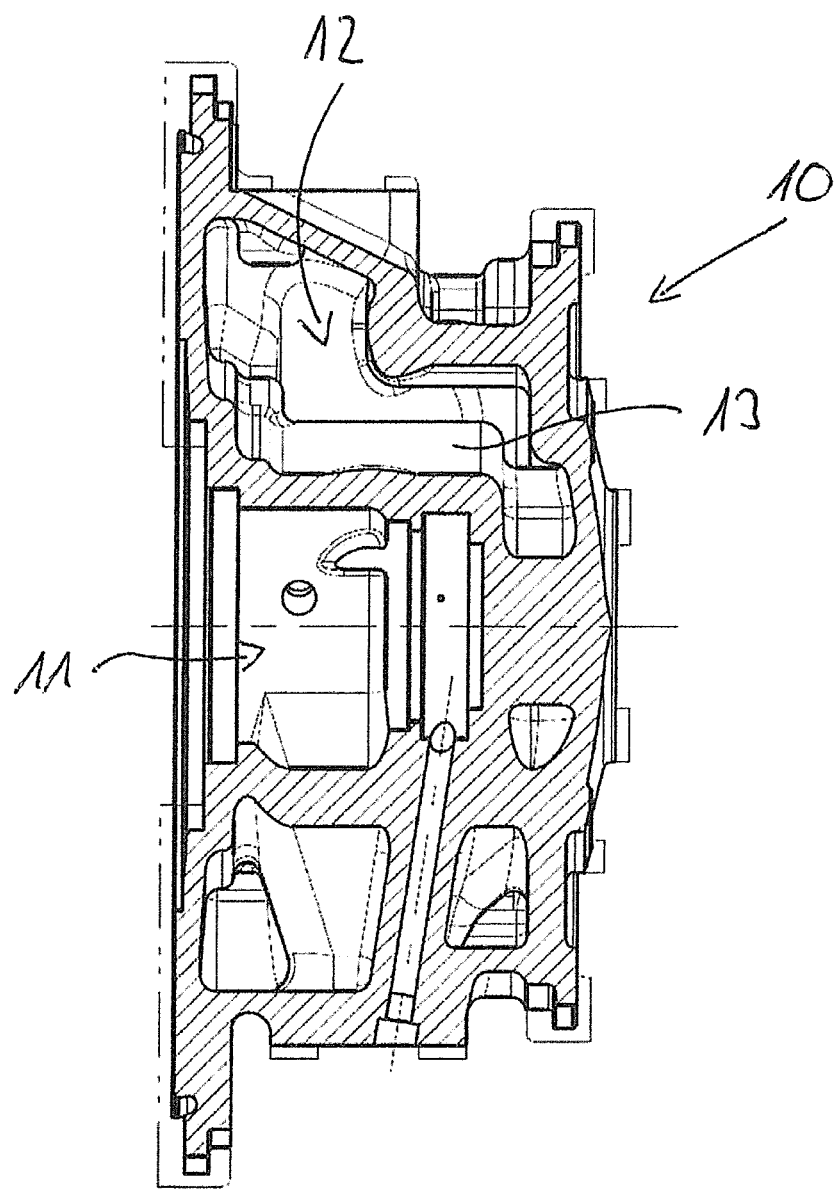
FIG. 1 is a cross section through a bearing housing of a turbocharger for illustrating the method according to the invention for processing a housing of a turbocharger.

FIG. 1 shows a cross section through a bearing housing 10 of an exhaust gas turbocharger. The bearing housing 10 comprises a central hollow space 11, which serves for mounting a shaft of the turbocharger that is not shown. On the outside, a hollow space 12 is introduced into the bearing housing, which during the operation can be filled with a coolant.

The bearing housing 10 is a metallic component. This metallic component is provided in a first step of the method according to the invention, for example in that the bearing housing 10 is produced by casting.

For processing the bearing housing 10, at least one hollow space of the bearing housing 10 is subsequently filled with an incompressible fluid, such as, for example, with water or oil.

In the case of the bearing housing 10 of FIG. 1, the hollow space 10 is preferentially filled with the incompressible fluid, i.e., that hollow space 12 which, during the operation of the turbocharger, serves for a coolant conduction.

Following the filling of the respective hollow space 12 of the bearing housing 10 with the incompressible fluid, a fluid pressure is built up within the hollow space 12 via which a housing portion 13 limiting the hollow space 12 of the bearing housing 10 at least in certain portions, in FIG. 1 a wall of the bearing housing 10 limiting the hollow space 12 radially inside, is plastically deformed at least in portions and thus at least locally.

Accordingly, following the filling of the hollow space 12 with the incompressible fluid, a fluid pressure is built up in the hollow space 12 filled with the incompressible fluid, via which a housing portion limiting the hollow space 12 of the bearing housing 10 is plastically deformed locally.

With an aspect of the invention it is not only possible to work a bearing housing 10 of a turbocharger, but also or alternately a compressor housing 20 (see FIG. 2) and a turbine housing 30 (see FIG. 3) of a turbocharger.

Figure 2:
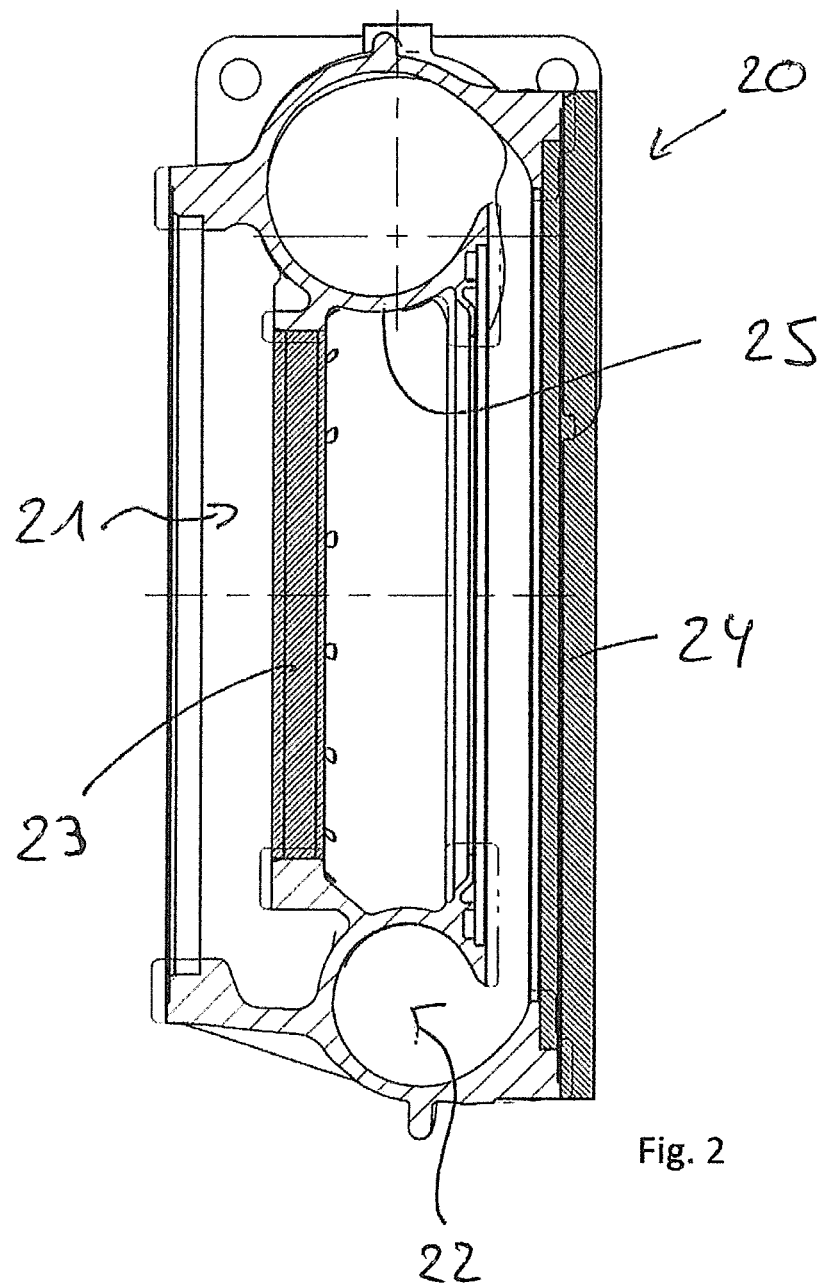
FIG. 2 is a cross section through a compressor housing of a turbocharger for illustrating the method according to the invention for processing a housing of a turbocharger.

FIG. 2 shows a cross section through a compressor housing 20 of a turbocharger which, in a central hollow space 21, receives a compressor rotor which is not shown. Radially outside, a spirally circulating hollow space 22 is embodied, which conducts the process gas of the compressor.

In order to now process the compressor housing 20 of the turbocharger following the provision of the metallic compressor housing 20, a hollow space of the compressor housing 20 is filled with an incompressible fluid, in FIG. 2 the spiral hollow space 22 of the compressor housing 20 conducting the process gas. In order to hold the incompressible fluid in this hollow space 22, the compressor housing 20 is closed via closing plates 23 and 24 on corresponding recesses.

The closing takes place prior to the filling of the spiral hollow space 22 with the incompressible fluid.

Following the filing of the hollow space 22 with the incompressible fluid a fluid pressure is built up, namely in the respective hollow space 22 filled with the incompressible fluid, as a result of which a housing portion 25 limiting the respective hollow space 22 of the compressor housing 20 is locally deformed plastically at least in portions.

This housing portion 25 locally deformed plastically is the housing wall limiting the spiral process gas flow conduction passage 22, which according to FIG. 2 is then in contact with the operating gas during the operation of the turbocharger.

Figure 3:
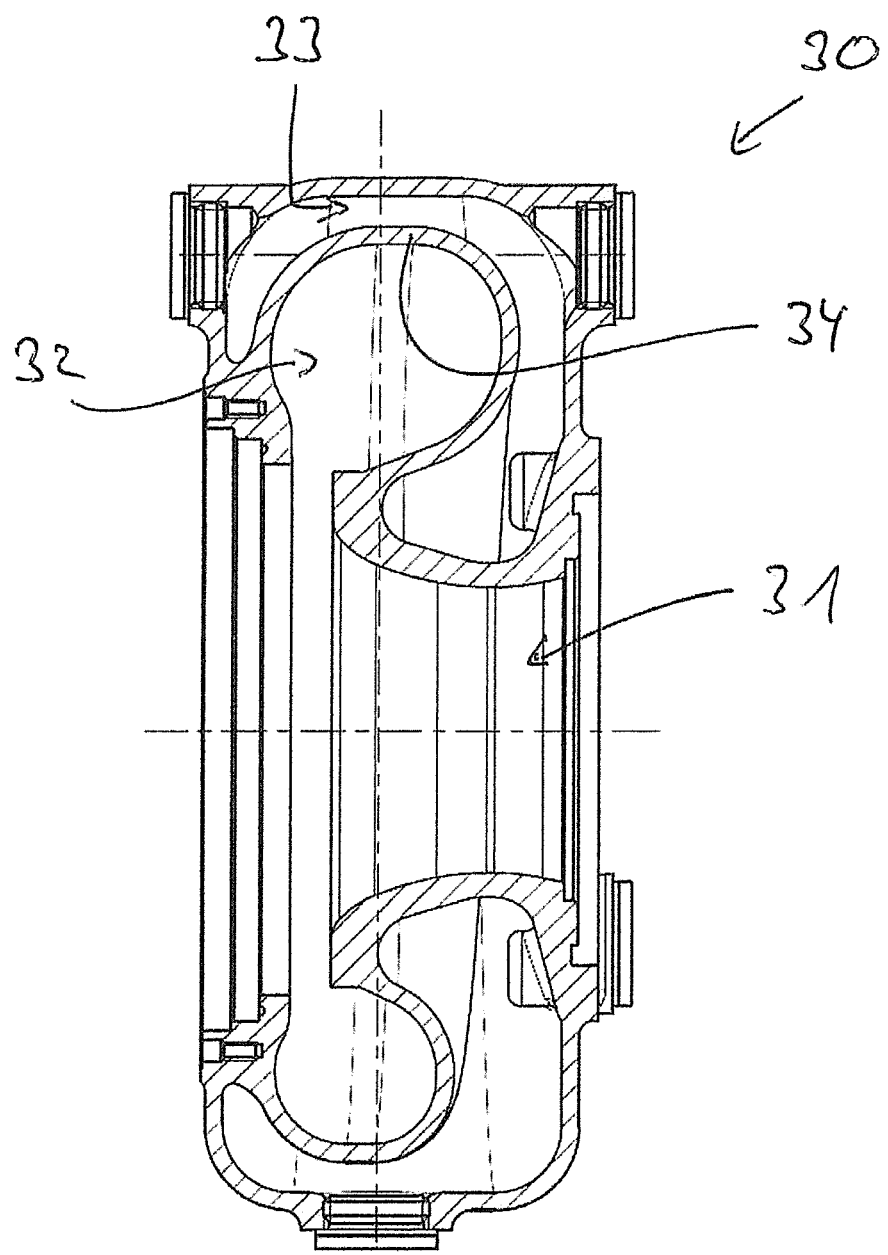
FIG. 3 is a cross section through a turbine housing of a turbocharger for illustrating the method according to the invention for processing a housing of a turbocharger.

FIG. 3 shows a cross section through a turbine housing 30 of a turbocharger, wherein a central hollow space 31 receives a turbine rotor which is not shown. The turbine housing 13 comprises two hollow spaces 32 and 33 radially outside, wherein a first of these two hollow spaces, namely the hollow space 32 serves for the process gas conduction of the turbine, whereas the hollow space 32 serves for coolant conduction. The turbine housing 30 is again a metallic component, which can be produced in particular by casting.

Following the provision of the turbine housing 30, at least one hollow space of the turbine housing 30 is filled with the incompressible fluid, for example with water or oil, for processing the turbine housing 30.

In FIG. 3 it is assumed that the hollow space 33, which during the operation of the turbocharger serves for the coolant conduction, is filled up with the incompressible fluid.

Following this, a fluid pressure is built up in the respective hollow space 33 filled with the incompressible fluid, locally plastically deforming a housing portion 34 limiting the hollow space 33 of the housing 30 at least in portions, wherein the locally plastically deformed housing portion 34 in FIG. 3 is a wall of the turbine housing 30, which separates the hollow space 32, which forms a process gas flow conduction passage, on the hollow space 33, which forms a coolant flow conduction passage 33.

In FIG. 3 it is also possible for the locally plastic deforming of the turbine housing 30 to fill the hollow space 32, which forms the process gas flow conduction passage, with the incompressible fluid, wherein then, corresponding to the exemplary embodiment of FIG. 2, the hollow space 32 is closed by way of suitable closing plates beforehand.

That fluid pressure, which is built up in the respective hollow space 12, 22, 32, 33 for locally plastically deforming the housing portion 13, 25, 34 limiting the respective hollow space 12, 22, 32, 33 in the housing 10, 20, 30 at least in portions, is determined dependent on the geometry and/or the wall thickness and/or the metallic material of the housing portion 13, 25, 34 to be locally deformed plastically.

Through the local plastic deforming of the housing 10, 20, 30 an internal stress is introduced into the respective locally plastically deformed housing portion 13, 25, 34, which counteracts a stress loading of a cyclical loading to be expected during the operation, i.e. has an opposite sign, wherein the amount of the internal stress introduced into the respective housing portion 13, 25, 34 through the plastic deformation, corresponds to the amount of the mean stress loading of the cyclical loading of the respective housing portion 13, 25, 34 to be expected during the operation. By way of this, the lifespan of the respective housing 10, 20 and 30 respectively can be particularly advantageous extended.

That fluid pressure, which is built up in the respective hollow space 12, 22, 32, 33 for the locally plastic deformation of the housing portion 13, 25, 34 limiting the respective hollow space 12, 22, 32, 33 of the housing 10, 20, 30 at least in portions, is thus determined dependent on the geometry and/or the wall thickness and/or the metallic material of the housing portion 13, 25, 34 to be locally deformed plastically. Dependent on these quantities, the fluid pressure is determined by simulation and calculations.

Preferentially, for the locally plastic deforming of the respective housing 10, 20 and 30, a hollow space of the respective housing is filled with the incompressible fluid, wherein this hollow space filled with the incompressible fluid preferentially serves for a process gas conduction during the operation of the turbocharger in the case of the compressor and in the case of the turbine. Likewise, the hollow space can serve for a coolant conduction.

With the invention, the mechanical load acting on the housing as a consequence of a cyclical loading can be reduced during the operation. By way of internal stresses introduced by the locally plastic deformation of the housing, counteract the cyclical loading. By way of this, the service life of a turbocharger can ultimately be extended.

As explained above, preferentially water or hydraulic oil is used as incompressible fluid which is utilized with the method according to the invention. The fluid pressure which is built up in the respective hollow space for the plastic deformation depends on the geometry, the wall thickness and the metallic material of that housing portion of the respective housing that is to be a plastically deformed, and on the internal stress to be introduced.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

REFERENCE LIST

10 Bearing housing
11 Hollow space
12 Hollow space
13 Housing portion
20 Compressor housing
21 Hollow space
22 Hollow space
23 Closing plate
24 Closing plate
25 Housing portion
30 Turbine housing
31 Hollow space
32 Hollow space
33 Hollow space
34 Housing portion

We claim:
1. A method for processing a housing (10, 20, 30) of a turbocharger, the housing including one selected from the group of: (a) a bearing housing (10) of the turbocharger, (b) a compressor housing of the turbocharger (20); and (c) a turbine housing (30) of the turbocharger, the method comprising:
providing the housing (10, 20, 30) to be processed, wherein the housing comprises metal and at least one housing portion (13, 25, 34);
filling at least one hollow space (12, 22, 32, 33) of the housing (10, 20, 30) to be worked with an incompressible fluid; and
increasing a fluid pressure in the respective at least one hollow space (12, 22, 33, 33) filled with the incompressible fluid so as to locally plastically deform the at least one housing portion (13, 25, 34) of the housing (10, 20, 30) limiting the respective at least one hollow space (12, 22, 32, 33) of the housing (10, 20, 30), at least in portions.

2. The method according to claim 1, wherein the fluid pressure for the local plastic deformation of the at least one housing portion (13, 25, 34) limits the respective hollow space (12, 22, 32, 33) of the housing (10, 20, 30) is determined dependent on a geometry and/or a wall thickness and/or a metallic material of the housing portion (13, 25, 34) to be locally deformed plastically.

3. The method according to claim 2, wherein the respective housing portion (13, 25, 34) of the housing (10, 20, 30) to be a plastically deformed is deformed plastically such that an amount of internal stress introduced into the respective housing portion (13, 25, 34) corresponds to a stress loading of the respective housing portion (13, 25, 34) expected during the local plastic deformation.

4. The method according to claim 3, wherein the respective housing portion (13, 25, 34) of the housing (10, 20, 30) to be plastically deformed is deformed plastically such that a residual stress introduced into the respective housing portion (13, 25, 34) in the plastic deformation has an opposite sign to a mean stress loading to be expected during the plastic deformation.

5. The method according to claim 4, wherein the incompressible fluid, during the operation of the turbocharger, performs process gas conduction.

6. The method according to claim 5, wherein the hollow space (22, 32) that is filled with the incompressible fluid is a spiral process gas flow conduction passage of the turbine housing (30), or a spiral process gas flow conduction passage of the compressor housing (20), wherein the housing portion (25, 43) at least locally deformed plastically comprises a wall limiting the spiral process gas flow conduction passage at least in portions, the incompressible fluid emanating from an inside portion of the wall that conducts process gas during operation of the turbocharger.

7. The method according to claim 4, wherein the incompressible fluid, during the operation of the turbocharger, performs a coolant conduction.

8. The method according to claim 7, wherein the hollow space (33) is a coolant passage of the housing that is separated from a process gas flow conduction passage of the housing by a wall, configured as the housing portion (34), the wall limiting the coolant passage at least in portions and adjoining a spiral process gas flow conduction passage, the incompressible fluid emanating from an outside portion of the wall that does not conduct process gas during the operation of the turbocharger.

9. The method according to claim 7, wherein the hollow space (12) which is filled incompressible fluid is a coolant passage of the bearing housing (10).

* * * * *